1

3,174,972
SUBSTITUTED PHENYLAMINO-4-QUINOLINES
André Allais and Pierre Girault, Paris, France, assignors to Roussel-UCLAF, S.A., Paris, France, a corporation of France
No Drawing. Filed July 3, 1962, Ser. No. 207,388
Claims priority, application France, July 10, 1961, 867,515; Oct. 17, 1961, 876,199
13 Claims. (Cl. 260—287)

The invention relates to novel quinoline derivatives having the formula

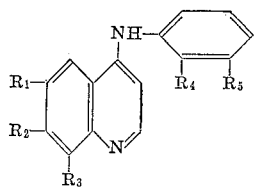

(I)

wherein $R_1$, $R_2$ and $R_3$ are selected from the group consisting of hydrogen, methyl, methoxy, trifluoromethyl and chlorine and $R_4$ and $R_5$ are selected from the group consisting of hydrogen, —COOH, —CONH$_2$ and —COOR wherein R is a lower alkyl radical, at least one of $R_4$ and $R_5$ being other than hydrogen and their pharmaceutically acceptable, non-toxic acid addition salts. The invention also relates to a process for the preparation of the quinoline derivatives of Formula I. The invention further relates to a method of relieving pain and inflammatory manifestations.

The novel quinoline derivatives of Formula I possess useful physiological properties and particularly an analgesic activity and an anti-inflammatory activity. They are useful for the treatment of muscular, articular or nervous pains, rheumatic troubles, zona, toothaches, migraine, febrile and infectious states.

It is an object of the invention to provide the novel quinoline derivatives of Formula I.

It is another object of the invention to provide a novel process for the preparation of the novel quinoline derivatives of Formula I.

It is a further object of the invention to provide a novel method of relieving pain and inflammatory manifestations.

These and other objects and advantages of the invention will become obvious from the following detailed description.

The novel quinoline derivatives of the invention are selected from the group consisting of compounds having the formula

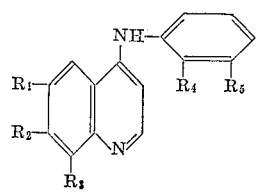

(I)

wherein $R_1$, $R_2$ and $R_3$ are selected from the group consisting of hydrogen, methyl, methoxy, trifluoromethyl and chlorine and $R_4$ and $R_5$ are selected from the group consisting of hydrogen, —COOH, —CONH$_2$ and —COOR wherein R is a lower alkyl radical, at least one of $R_4$ and $R_5$ being other than hydrogen and their pharmaceutically acceptable, non-toxic acid addition salts.

Examples of pharmaceutically acceptable, non-toxic acids used to form the acid addition salts are hydrochloric acid, acetic acid, D-tartaric acid, citric acid, etc.

The process of the invention for the preparation of the novel quinoline derivatives of Formula I comprises condensing an aniline compound of the formula

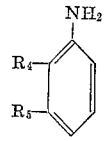

wherein $R_4$ and $R_5$ have the above definitions with a 4-chloroquinoline of the formula

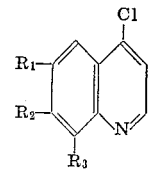

wherein $R_1$, $R_2$ and $R_3$ have the above definitions in the presence of a mineral acid to form the mineral acid salt of quinoline derivatives of Formula I, reacting the latter with an alkaline agent to form the free bases of the quinoline derivative of Formula I which may be transformed into its acid addition salt and recovering the desired compound. The mineral acid is preferably hydrochloric acid although other acids such as sulfuric acid may be used. The alkaline agent is preferably an alkali metal hydroxide such as sodium hydroxide or an aqueous ammonia solution. The reaction scheme is illustrated in Table I.

TABLE I

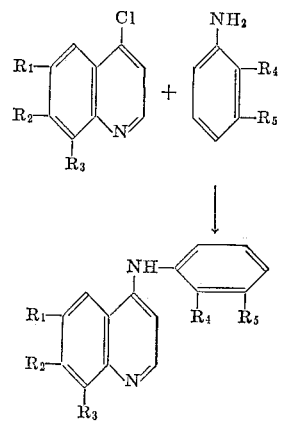

wherein $R_1$, $R_2$, $R_3$, $R_4$ and $R_5$ have the above definitions.

The novel method of relieving pain and inflammatory manifestations comprises administering an effective amount of a compound selected from the group consisting of compounds having the formula

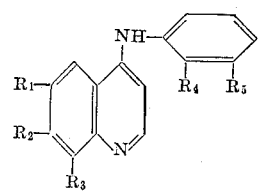

(I)

wherein $R_1$, $R_2$ and $R_3$ are selected from the group consisting of hydrogen, methyl, methoxy, trifluoromethyl and chlorine and $R_4$ and $R_5$ are selected from the group consisting of hydrogen, —COOH, —CONH$_2$ and —COOR wherein R is a lower alkyl radical, at least one of $R_4$ and $R_5$ being other than hydrogen and their pharmaceutically acceptable, non-toxic acid addition salt.

The compounds may be administered orally, transcutaneously, or by local application, by topical application on the skin and mucous surfaces, or by rectal administration or in the form of intramuscular and subcutaneous injections.

The compounds can be used in the form of injectable solutions or suspensions, prepared in ampules, in multiple dose flacons, in the form of tablets, of sugared tablets, of syrups, of suppositories and of pomades.

In the following examples there are described several preferred embodiments to illustrate the invention. However, it should be understood that the invention is not intended to be limited to the specific embodiments.

*Example I*

PREPARATION OF 4-(2'-CARBOMETHOXYPHENYL-AMINO)-7-CHLORO-QUINOLINE 39.6 gm. of 4,7-dichloroquinoline were introduced into 200 cc. of 2 N hydrochloric acid. 30 gm. of methyl anthranilate were added and the solution was heated to reflux under agitation for a period of three hours. The reaction mixture was cooled to 10° C. and allowed to stand for a period of one hour at this temperature. Upon vacuum filtering, 65 gm. of the raw hydrochloride salt of 4-(2'-carbomethoxyphenylamino)-7-chloroquinoline were obtained having a melting point of 228° to 230° C.

In order to obtain the corresponding free base 60 gm. of the hydrochloride salt were dissolved in 600 cc. of 80% ethanol and concentrated ammonia was added until the solution was clearly alkaline. The reaction mixture was cooled and the product formed was vacuum filtered. The filtrate was washed successively with water, with alcohol and with ether and dried. 43 gm. of 4-(2'-carbomethoxyphenylamino)-7-chloroquinoline were recovered having a melting point of 166° C.

The product occurred in the form of white needles having a yellow reflection. It was soluble in benzene and chloroform, slightly soluble in alcohol and acetone and insoluble in water.

*Analysis.*—$C_{17}H_{13}ClN_2O_2$: molecular weight=312.7. Calculated: C, 65.29%; H, 4.19%; Cl, 11.33%; N, 8.96%. Found: C, 65.3%; H, 4.1%; Cl, 11.3%; N, 8.8%.

This compound is not described in the literature.

By heating to reflux a suspension of 5 gm. of 4-(2'-carbomethoxyphenylamino)-7-chloroquinoline in 50 cc. of methanol and adding thereto 9 cc. of methanol containing 6.65% of hydrochloric acid, there is obtained a methanolic solution of the hydrochloride of 4-(2'-carbomethoxyphenylamino)-7-chloroquinoline. On cooling, the hydrochloride salt crystallized. The solution was iced for a period of one hour and the precipitate was vacuum filtered, washed by trituration with 5 cc. of iced methanol, then twice with 5 cc. of chloroform. The crystals were dried under vacuum and 4.85 g. of the pure hydrochloride salt of 4-(2'-carbomethoxyphenylamino)-7-chloro-quinoline were obtained having a melting point of 247–249° C.

The D-tartrate of 4-(2'-carbomethoxyphenylamino)-7-chloro-quinoline was obtained in analogous manner.

A suspension of 4 g. of 4-(2'-carbomethoxyphenylamino)-7-chloro-quinoline in 80 cc. of absolute ethanol was heated to reflux. Then a solution of 2.15 g. of D-tartaric acid in 20 cc. of absolute ethanol was added thereto. There was a complete solution and crystallization almost immediately. The solution was cooled and iced for two hours. The crystals were vacuum filtered, washed twice by triturations with 5 cc. of iced methanol, and dried under vacuum. 5.9 g. of the pure D-tartrate of 4-(2'-carbomethoxyphenylamino)-7-chloro-quinoline were obtained, having a melting point of 248–250° C. (with decomposition).

*Analysis.*—$C_{21}H_{19}ClN_2O_8$: molecular weight=462.8. Calculated: C%, 54.19; H%, 4.13; Cl%, 7.66; N%, 6.05. Found: C%, 54.3; H%, 4.1; Cl%, 7.7; N%, 6.2.

This compound is not described in the literature.

*Example II*

PREPARATION OF 4-(3'-CARBOMETHOXYPHENYL-AMINO)-7-CHLOROQUINOLINE 15.5 g. of methyl meta-aminobenzoate and 20 g. of 4,7-dichloroquinoline were introduced into 200 cc. of N-hydrochloric acid. The reaction mixture was heated to reflux under agitation for a period of three hours and then allowed to stand at rest overnight. The precipitate formed was vacuum filtered, washed with water, triturated with ethanol and ether, and dried. 33 g. of the hydrochloride of 4-(3'-carbomethoxyphenylamino)-7-chloro - quinoline having a melting point of about 280° C. were obtained.

In order to obtain the corresponding free base the 33 g. of the said hydrochloride were dissolved in 850 cc. of boiling 50% ethanol. 150 cc. of concentrated ammonia were added. The precipitate formed was vacuum filtered and dried under vacuum. 26 g. of 4-(3'-carbomethoxyphenylamino)-7-chloro-quinoline having a melting point of 218° C. were obtained. The product was purified by recrystallization from boiling dioxane and trituration with petroleum ether. It was insoluble in water, ether, benzene, chloroform, and dilute aqueous alkalis, slightly soluble in dilute aqueous acids, alcohols and acetone.

*Analysis.*—$C_{17}H_{13}O_2N_2Cl$: molecular weight=312.7. Calculated: C%, 65.29; H%, 4.19; N%, 8.96; Cl%, 11.33. Found: C%, 65.5; H%, 4.2; N%, 8.9; Cl%, 11.2.

This compound is not described in the literature.

*Example III*

PREPARATION OF 4-(2'-CARBOMETHOXYPHENYL-AMINO)-7-METHOXYQUINOLINE 8 g. of 4-chloro-7-methoxy-quinoline and 6.7 g. of methyl anthranilate were introduced into a solution of 9 cc. of concentrated hydrochloric acid in 50 cc. of water. The mixture was heated to reflux under agitation for a period of about three hours. The reaction mixture was cooled to 20° C. and the precipitate formed was vacuum filtered, washed successively with ice water and with ether, and dried under vacuum. 10 g. of the hydrochloride salt of 4-(2'-carbomethoxyphenylamino)-7-methoxy-quinoline were obtained.

In order to obtain the corresponding free base, the product obtained above was dissolved at elevated temperatures in 300 cc. of water. Then 25 cc. of ammonia solution were added. The reaction mixture was cooled and the precipitate was vacuum filtered, washed with water, and dried under vacuum. 7 g. of 4-(2'-carbomethoxyphenylamino)-7-methoxy-quinoline were thus obtained which was purified by recrystallization in isopropyl ether. The purified product had a melting point of 108° C.

The product was soluble in alcohol, benzene, acetone and dilute aqueous acids, slightly soluble in ether and chloroform, and insoluble in water.

*Analysis.* — $C_{18}H_{16}O_3N_2$: molecular weight=308.3. Calculated: C%, 70.12; H%, 5.23; N%, 9.08. Found: C%, 70.0; H%, 5.2; N%, 9.3.

This compound is not described in the literature.

*Example IV*

PREPARATION OF 4-(2'-CARBOMETHOXYPHENYL-AMINO)-QUINOLINE 10 g. of 4-chloroquinoline and 9.2 gm. of methyl anthanilate were introduced into a solution of 12 cc. of concentrated hydrochloric acid in 100 cc. of water. The reaction mixture was heated to 95–100° C. for a period of about four hours and then cooled. The crystalline precipitate was vacuum filtered, triturated with water, and dried under vacuum. 10.5 g. of the hydrochloric acid salt of 4-(2'-carbomethoxyphenylamino)-quinoline having a melting point of 260–265° C. (with decomposition) were obtained.

In order to obtain the corresponding free base the product obtained above was dissolved at an elevated temperature in 100 cc. of water and 20 cc. of ammonia solution were added thereto. The reaction mixture was cooled to 20° C. and the precipitate obtained was vacuum filtered, and washed with water. The precipitate was dissolved in 30 cc. of boiling ethanol. The solution was allowed to crystallize in the cold and the crystals were vacuum filtered, washed with ether and dried under vacuum. 8.5 g. of 4-(2'-carbomethoxyphenylamino)-quinoline were obtained which was purified by recrystallization from acetone, the pure product having a melting point of 142° C.

This product was soluble in benzene, chloroform, slightly soluble in dilute aqueous acids, and insoluble in water, ether and dilute aqueous alkalis.

Analysis. — $C_{17}H_{14}O_2N_2$: molecular weight=278.3. Calculated: C%, 73.36; H%, 5.07; N%, 10.07. Found: C%, 73.6; H%, 5.1; N%, 10.1.

This product is not described in the literature.

Example V

PREPARATION OF 4-(2'-CARBOMETHOXYPHENYL AMINO)-6,8-DIMETHYL-QUINOLINE 20 g. of 4-chloro-6,8-dimethyl-quinoline and 15.7 g. of methyl anthranilate were introduced into a solution of 21 cc. of concentrated hydrochloric acid in 180 cc. of water. The reaction mixture was heated to reflux under agitation for a period of about four hours and then cooled to 20° C. The crystalline precipitate formed was vacuum filtered and 28 g. of the hydrochloride salt of 4-(2'-carbomethoxyphenylamino)-6,8-dimethyl-quinoline were obtained.

In order to obtain the corresponding free base, the product obtained above was dissolved at elevated temperatures in 400 cc. of water. 50 cc. of ammonia solution were added thereto and the reaction mixture was cooled. The precipitate formed was vacuum filtered, washed with water, and dried. 22 g. of 4-(2'-carbomethoxyphenylamino)-6,8-dimethylquinoline were obtained which was purified by recrystallization with ethanol to give a pure product having a melting point of 167–168° C.

This product was slightly soluble in ether, acetone, benzene, chloroform and dilute aqueous acids, and insoluble in water.

Analysis.—$C_{19}H_{18}O_2N_2$: molecular weight=306.35. Calculated: C%, 74.49; H%, 5.92; O%, 10.44; N%, 9.14. Found: C%, 74.7; H%, 5.9; O%, 10.2; N%, 9.3.

This product is not described in the literature.

Example VI

PREPARATION OF 4-(2'-CARBAMOLIPHENYLAMINO)-(7-CHLORO-QUINOLINE 10 g. of 4,7-dichloro-quinoline and 6.9 g. of O-aminobenzamide were introduced into 100 cc. of N hydrochloric acid. The reaction mixture was heated to reflux under agitation for a period of about two and a half hours and then iced for a period of one hour. The precipitate formed was vacuum filtered, washed with water and dried under vacuum. 15 g. of the hydrochloride salt of 4-(2'-carbamoylphenylamino)-7-chloro-quinoline were obtained having a melting point of 263–266° C. (with decomposition).

In order to obtain the corresponding free base, the hydrochloride salt obtained above was dissolved at elevated temperatures in 10 volumes of 50% ethanol. 50 cc. of ammonia solution were added and the reaction mixture was iced for a period of about one hour. The crystalline precipitate formed was vacuum filtered, washed with water and dried under vacuum. 12.7 g. of 4-(2'-carbamoylphenylamino)-7-chloro-quinoline having a melting point of 260° C. were obtained, which was purified by recrystallization in butanol.

This product was soluble in dimethylformamide and acetic acid, slightly soluble at elevated temperatures in alcohol and dilute aqueous acids, insoluble in water, ether, acetone, benzene, chloroform, and dilute aqueous alkalis.

Analysis.—$C_{16}H_{12}ON_3Cl$: molecular weight=297.7. Calculated: C%, 64.55; H%, 4.06; N%, 14.11; Cl%, 11.91. Found: C%, 64.5; H%, 4.3; N%, 13.9; Cl%, 11.7.

This compound is not described in the literature.

Example VII

PREPARATION OF 4-(2'-CARBOBUTOXYPHENYL-AMINO)-7-CHLORO-QUINOLINE 19.8 g. of 4,7-dichloro-quinoline and 19.3 g. of n-butyl anthranilate were introduced into 200 cc. of 1 N hydrochloric acid. The reaction mixture was heated to reflux while agitating for a period of about four hours. The reaction mixture was then cooled under agitation and iced for a period of about an hour. The crystalline precipitate formed was vacuum filtered, washed with water and dried. 40 g. of the raw hydrochloride salt of 4-(2'-carbobutoxyphenylamino)-7-chloro-quinoline were obtained.

In order to liberate the corresponding free base, 40 g. of the said hydrochloride salt were dissolved at reflux temperatures in 1500 cc. of water. Then 100 cc. of concentrated ammonia solution was added. The reaction mixture was cooled and extracted several times with ether. The combined extracts were dried over sodium sulfate and distilled to dryness. 25 g. of 4-(2'-carbobutoxyphenylamino)-7-chloro-quinoline were obtained, which was purified by recrystallization in isopropyl ether to give a pure product having a melting point of 82–84° C.

This product was soluble in alcohol and acetone, slightly soluble in ether, benzene, chloroform and dilute aqueous acids, and insoluble in water.

Analysis.—$C_{20}H_{19}O_2N_2Cl$: molecular weight=354.8. Calculated: C%, 67.70; H%, 5.39; O%, 9.02; N%, 7.89; Cl%, 9.98. Found: C%, 67.9; H%, 5.4; O%, 9.1; N%, 7.9; Cl%, 10.2.

This product is not described in the literature.

Example VIII

PREPARATION OF 4-(2'-CARBOMETHOXYPHENYL-AMINO)-7-TRIFLUOROMETHYL-QUINOLINE 20 g. of 4-chloro-7-trifluoromethyl-quinoline and then 13 g. of methyl anthranilate, 17 cc. of concentrated hydrochloric acid and 100 cc. of water were introduced into a 250 cc. balloon flask under agitation. The suspension thus formed was heated to reflux until a complete dissolution occurred and the solution became colored. The reflux was maintained for a period of three hours. Then, the reaction mixture was cooled and iced for a period of one hour. The crystalline precipitate of the hydrochloride of 4-(2'-carbomethoxyphenylamino)-7-trifluoromethyl-quinoline was separated, vacuum filtered, washed with ice water, and dried.

The product was redissolved at elevated temperatures in 250 cc. of methanol and then 50 cc. of concentrated ammonia solution was added at elevated temperatures. The 4-(2'-carbomethoxyphenylamino)-7-trifluoromethyl-quinoline precipitated. The reaction mixture was maintained on an ice bath for a period of one hour. The precipitate was separated by vacuum filtration, was washed with water, and then dried under vacuum. 19.4 g. of 4-(2'-carbomethoxyphenylamino)-7-trifluoromethyl-quinoline were thus obtained, being a yield of 65%. The product was purified by recrystallization from isopropyl ether. Its melting point determined on the Kofler block was 136° C.

4-(2'-carbomethoxyphenylamino) - 7 - trifluoromethyl-quinoline occurred in the form of a solid colorless compound crystallized in needles. It was soluble in alcohol, acetone, benzene and chloroform, slightly soluble in dilute aqueous acids, ether, isopropyl ether and olive oil, and insoluble in aqueous solvents and water.

Analysis.—$C_{18}H_{13}N_2O_2F_3$: molecular weight=346.3. Calculated: C%, 62.42; H%, 3.79. Found: C%, 62.7; H%, 3.5.

This compound is not described in the literature.

Example IX

By using a process analogous to Example VIII, the following quinoline derivatives were obtained.

(a) 4 - (2' - carbomethoxyphenylamino)-6,7-dimethyl-quinoline with a melting point of 168-169° C., and its hydrochloride salt.

(b) 4 - (2' - carboxyphenylamino)-7-chloro-quinoline having a melting point of 305-306° C., and its hydrochloride salt.

(c) 4 - (2' - carbomethoxyphenylamino - 7,8 - dichloro-quinoline having a melting point of 260-261° C., and its hydrochloride salt.

(d) 4 - (2' - carbomethoxyphenylamino) - 6 - chloro-quinoline having a melting point of 190° C. and its hydrochloride salt.

(e) 4 - (2' - carbomethoxyphenylamino) - 8 - chloro-quinoline having a melting point of 183-184° C. and its hydrochloride salt.

These compounds were not described in the literature.

Pharmacological studies

A. 4-(2'-CARBOMETHOXYPHENYLAMINO)-7-CHLORO-QUINOLINE (1) *Anti-inflammatory activity.*—The anti-inflammatory activity of 4-(2'-carbomethoxyphenylamino)-7-chloroquinoline was compared with that of aspirin, amodiaquin and butazolidine. The test used consisted in administering in a single injection, 500γ of naphtoylheparamine under the aponevrosis of the sole of a hind paw of rats weighing 160 to 170 g. (This injection being destined to provoke the formation of an inflammatory edema.) The products to be studied were administered by oral methods one hour before the injection. The maximum circumference of the two hind paws was measured three hours after the injection and the difference between the circumferences of the two hind paws of each animal (the paw having received the injection of naphtoylheparamine and the intact paw) serves to evaluate the importance of the inflammation. The measure of inflammation in the rats treated was expressed in percent in reference to that of the control animals. The results are summarized in Table II.

TABLE II

| Dose Administered in mg./kg. | Degree of Inflammation in percent with Reference to the Controls | | | |
|---|---|---|---|---|
| | 4-(2'-carbo-methoxyphenyl-amino)-7-chloro quinoline | Butazol-idine | Aspirin | Amodi-aquin |
| 25 | 54 (16) | | | |
| 30 | | 48 (16) | | |
| 50 | 35 (16) | 43 (16) | 67 (16) | |
| 100 | 25 (16) | 39 (8) | 52 (32) | |
| 200 | 37 (18) | 26 (8) | 38 (16) | 65 (16) |
| 50% active dose expressed in mg./kg. | 30 | 30 | 100-150 | 200 |

Values between the parentheses indicate the number of animals tested.

4 - (2'-carbomethoxyphenylamino)-7-chloro-quinoline has an anti-inflammatory activity comparable to that of butazolidine and superior to that of aspirin and amodiaquine.

(2) *Analgesic activity.*—The analgesic activity of 4-(2' - carbomethoxyphenylamino)-7-chloro-quinoline was compared with that of aspirin. The test used was based on the fact noted by Koster et al., Fed. Proc., 1959, 18, 412, that the intra-peritoneal injection of acetic acid provokes, in mice, repeated movements characteristic of stretchings and twistings which persist more than six hours. The analgesics prevent or suppress this syndrome which, from this fact, can be considered as the exteriorization of a diffuse abdominal pain.

A solution of 6% acetic acid in water containing 10% of gum arabic was used. The dose releasing the syndrome under these conditions is 0.01 cc. per gram, being 60 mg. per kg. of acetic acid. The analgesics were administered by oral methods in the form of aqueous suspensions containing polysorbate 80 a half hour before the intra-peritoneal injection of acetic acid, the mice being without food or drink since the day before the day of the test. For each dose and for the controls used in each test, a group of 5 animals was used. The stretchings were observed, noted and counted for each mouse, then added by groups of five during two periods of observation of 5 minutes, as follows:

(1) As soon as possible after the injection of acetic acid (0 to 5 minutes).

(2) 15 minutes after (15 to 20 minutes).

After 55 tests, the average number of stretchings observed on the groups of 5 controls during 2 periods of observation indicated was established at 58 and 56 (being 12 and 11 per animal). The previous administration of the products being tested diminished the number of stretchings proportional to the dose utilized as is shown in Table III.

TABLE III

| Products and Dose Used | Number of Stretches | | | |
|---|---|---|---|---|
| | From 0 to 5 minutes | From 15 to 20 minutes | Total number of stretches | Total number as percent of controls |
| Controls (55) | 58 | 56 | 114 | |
| Aspirin: | | | | |
| 100 mg./kg. (5) | 27 | 52 | 79 | 69 |
| 200 mg./kg. (4) | 13 | 34 | 47 | 41 |
| 500 mg./kg. (4) | 3 | 19 | 22 | 19 |
| 4-(2'-carbomethoxy-phenylamino)-7-chloroquinoline: | | | | |
| 20 mg./kg. (3) | 33 | 77 | 110 | 95 |
| 50 mg./kg. (3) | 35 | 43 | 78 | 68 |
| 100 mg./kg. (3) | 12 | 18 | 30 | 26 |
| 200 mg./kg. (3) | 5 | 18 | 23 | 20 |
| 500 mg./kg. (3) | 7 | 15 | 22 | 19 |

The values between the parentheses indicate the number of tests made (each corresponding to 1 lot of 5 mice) in order to establish the averages, which figures are shown in the table.

Aspirin and 4-(2'-carbomethoxyphenylamino)-7-chloro quinoline were administered in the form of aqueous suspensions containing polysorbate 80.

The results of Table III show that the relation between the doses and the changes in activity are practically parallel for the two products but the $DE_{50}$ (dose necessary and sufficient to effect 50% reduction in stretchings from the controls) of 4-(2'-carbomethoxyphenylamino)-7-chloro-quinoline is much lower than that of aspirin as seen in Table IV.

TABLE IV

| Compound | Dose in mg./kg. | Number of stretchings as a percent of controls |
|---|---|---|
| 4-(2'-Carbomethoxy-phenylamino)-7-chloro-quinoline | 20 | 95 |
| | 50 | 66 |
| | 100 | 25 |
| | 200 | 20 |
| Aspirin | 100 | 70 |
| | 200 | 42 |
| | 500 | 20 |

The $DE_{50}$ of 4-(2'-carbomethoxyphenylamino)-7-chloro-quinoline is 70 mg./kg. while that of aspirin is 165 mg./kg. which shows that the former is more than twice as effective as aspirin as an analgesic.

(3) *Acute toxicity.*—The toxicity of 4-(2'-carbomethoxyphenylamino)-7-chloro-quinoline was determined on groups of 5 mice who were not fed food or water on the day before the day of the test. The product was administered in doses of 1, 2, 3, 4 and 5 g./kg. in aqueous suspensions containing polysorbate 80 by means of a gastric tube.

The mice were held under observation for 8 days and no toxic symptoms or mortality was noted even with a dose of 5 g./kg. The $DL_{50}$ of aspirin is about 1.5 g./kg. under the same conditions.

(4) *Dosages.*—The usual useful dose of 4-(2'-carbomethoxyphenylamino)-7-chloro-quinoline is between 0.20 gm. to 1.0 gm. per dose and a daily dose of 0.50 gm. to 4.0 gm. in the adult depending upon the method of administration.

B. 4-(2'-CARBOBUTOXYPHENYLAMINO)-7-CHLORO-QUINOLINE (1) *Analgesic activity.*—The analgesic activity of 4-(2'-carbobutoxyphenylamino)-7-chloro-quinoline was determined by the Koster et al. method discussed above and the product was administered in the form of aqueous suspensions containing polysorbate 80. As can be seen from Table V, the number of stretchings were reduced in proportion to the size of the dose used and the $ED_{50}$ is less than 200 mg./kg.

TABLE V

| Dose Used | Number of Stretches | | |
|---|---|---|---|
| | From 0 to 5 minutes | From 15 to 20 minutes | Total number of stretches |
| Controls | 100 | 86 | 186 |
| 4-(2'carbobutoxy-phenylamino)-7-chloro-quinoline: | | | |
| 100 mg./kg | 41 | 77 | 118 |
| 200 mg./kg | 23 | 57 | 80 |
| 500 mg./kg | 24 | 43 | 67 |

The analgesic activity of 4-(2'-carbobutoxyphenylamino)-7-chloro-quinoline on inflamed tissue was also determined using the slightly modified method of Randall et al. (Arch. Int. Pharmacodynamic, vol. 111, 1957, p. 409). In this test, a local inflammation was provoked by injection of 0.1 cc. of a suspension of 20% brewer's yeast under the aponevrosis of the sole of one of the hind paws of a rat. The pain was provoked by gradually increasing mechanical pressure applied on the surface of the sole of the inflamed paw. The threshold of the pain was measured in millimeters of mercury expressing the pressure necessary and sufficient in order to release a characteristic reaction of withdrawal. The comparison with the other paw allows the determination of the activity of the compound studied. An effect on the two hind paws indicates a central analgesic action and effect on the inflamed paw exclusively indicates a peripheric analgesic action.

The compounds to be studied were administered orally in the form of suspension 4 hours after the injection of the brewer's yeast. The tests were effected immediately before, then one-half hour, one hour and two hours after the administration of 4-(2'-carbobutoxyphenylamino)-7-chloro-quinoline and aspirin. The tests were made by using five rats per dose of the compound studied. The difference of pressure necessary in order to attain the threshold of pain on the inflamed paw before and after administration of 4-(2'-carbobutoxyphenylamino)-7-chloro-quinoline and of aspirin measured their effects. The results obtained showed that 4-(2'-carbobutoxyphenylamino)-7-chloro-quinoline was in this test about 2 times more active than aspirin.

(2) *Anti-inflammatory activity.*—4-(2'-carbobutoxyphenylamino)-7-chloro-quinoline was compared with butazolidine, aspirin and amodiquin in a test on inflammatory edema as before. The test consisted in administering a single dose of 500γ of naphthoyl heparamine under the aponevrosis of the sole of a hind paw of rats weighing 160 to 170 gm. each. The results are summarized in Table VI.

TABLE VI

| Dose Administered in mg./kg. | Degree of Inflammation in percent with Reference to the Controls | | | |
|---|---|---|---|---|
| | 4-(2'-carbobutoxyphenylamino)-7-chloro quinoline | Butazolidine | Aspirin | Amodiaquin |
| 10 | 80 | | | |
| 20 | 56 | 67 | | |
| 50 | 35 | 43 | 67 | |
| 100 | 25 | 39 | 52 | |
| 200 | | 26 | 38 | 65 |
| 50% active dose expressed in mg./kg | (¹) | 30 | 100-150 | 200 |

¹ Between 25 and 30.

The results in Table VI show that 4-(2'-carbobutoxyphenylamino)-7-chloro-quinoline has an anti-inflammatory activity equal to butazolidine and greater than aspirin or amodiaquin.

4-(2'-carbobutoxyphenylamino)-7-chloro-quinoline was compared with aspirin and amodiaquin on erythema caused by ultraviolet rays in guinea pigs. The method used was derived from that of Winder (Arch. Inter. Pharmacody, vol. 116, 1958, p. 261) and of Adams (J. Pharm. Pharmacol., vol. 12, 1960, p. 251).

Guinea pigs weighing between 600 and 900 gm. each had their dorsal skin shaved and on each three areas of skin 8 mm. in diameter were exposed for two minutes at a distance of 20 cm. to the ultraviolet rays of a 550 watt Actisol lamp having a quartz tube. After the first hour, the products were orally administered to the guinea pigs with a gastric tube.

After the second hour the intensity of the erythema obtained on the level of the three skin-areas of each guinea pig was noted according to an arbitrary scale of 0 to 3 and was compared to controls having orally received the solvent or the dispersive alone. One test includes in general three groups of five guinea pigs. The average of degree of erythema was established by group. In each of the controls it varied generally between 1.2 and 2. The degree of erythema of the treated groups is expressed in percent of that of the controls. The results obtained with 4-(2'-carbobutoxyphenylamino)-7-chloro-quinoline, aspirin and amodiaquin are given in Table VII.

TABLE VII

| Doses in mg./kg. | Degree of Erythema in percent of Controls | | |
|---|---|---|---|
| | 4-(2'-carbobutoxy-phenylamino)-7-chloro quinoline | Aspirin | Amodiaquin |
| 50 mg./kg | | 82 | |
| 100 mg./kg | 47 | 19 | |
| 200 mg./kg | | 12 | 89 |

This table shows the said product manifests a lower activity on erthema than aspirin. It has however an interesting anti-inflammatory effect.

(3) *Acute toxicity.*—4-(2'-carbobutoxyphenylamino)-7-chloro-quinoline was administered orally in the form of a suspension in an aqueous dispersive solvent to lots of ten mice of the Rockland strain weighing between 18 and 22 g. The medicine was administered in large doses of 1 g. and 2 g./kg. The animals were kept under observation for a period of ten days and presented no symptom of intoxication or mortality. Therefore, the compound is non-toxic to mice even at doses of 2 g./kg. when orally administered to mice.

(4) *Dosages.*—The usual useful dose of 4-(2'-carbobutoxyphenylamine)-7-chloro-quinoline is between 100 and 200 mg. per dose and a daily dose of 200 mgm. to 1 mg. in the adult depending upon the method of administration.

C. 4-(2'-CARBOMETHOXYPHENYLAMINO)-7-TRIFLUOROMETHYL-QUINOLINE (1) *Anti-inflammatory activity.*—The anti-inflammatory activity of 4-(2'-carbomethoxyphenylamino)-7-trifluoromethyl-quinoline was compared with aspirin and amodiaquin according to the above method. The results are shown in Table VIII.

TABLE VIII

| Compounds Studied | Method of administration | Doses Studied, mg./kg. | Average efficacious Dose, mg./kg. |
|---|---|---|---|
| Aspirin | Aqueous suspension orally. | 50 to 300 | 100 |
| Amodiaquin | do | 200 | ≥200 |
| 4-(2'-carbomethoxyphenyl-amino)-7-trifluoromethylquinoline. | do | 25 to 200 | 60 |

Table VIII clearly shows the superior anti-inflammatory activity of 4-(2'-carbomethoxyphenylamino)-7-trifluoromethyl-quinoline as compared to aspirin and amodiaquin.

4-(2'-carbomethoxyphenylamino)-7-trifluoromethyl-quinoline was compared with aspirin and amodiaquin on erythema caused by ultraviolet rays in guinea pigs. The test consisted in submitting a lot of guinea pigs to ultraviolet radiation with an ultraviolet lamp placed 20 cm. from the animals for a period of 2 minutes. The compounds tested were administered orally in suspension in an aqueous dispersion an hour before exposure to ultraviolet rays. Two hours after the irradiation the degree of erythema of the animals in the test was noted. The average efficacious dose, $DE_{50}$, which diminished the highest percentage of erythema of the treated animals by 50% with reference to the control animals was determined. The results are summarized in Table IX.

TABLE IX

| Compounds Studied | Method of administration | Doses Studied, mg./kg. | Average efficacious Dose, mg./kg. |
|---|---|---|---|
| Aspirin | Aqueous suspension orally. | 50 to 200 | 50 to 100 |
| Amodiaquin | do | 200 | ≥200 |
| 4-(2'-carbomethoxyphenyl-amino)-7-trifluoromethylquinoline. | do | 10 to 200 | 30 |

The results in Table IX clearly demonstrate the superior anti-inflammatory activity of 4-(2'-carbomethoxyphenylamino)-7-trifluoromethyl-quinoline as compared to aspirin and amodiaquin.

(2) *Analgesic activity.*—The analgesic activity of 4-(2'-carbomethoxyphenylamino)-7-trifluoromethyl-quinoline was determined by the Koster et al. method discussed previously. The product was administered in suspension in an aqueous dispersing solvent. The results are summarized in Table X.

TABLE X

| Compound | Dose, mg. | Number of Stretchings | | | Total number as a percent of the controls |
|---|---|---|---|---|---|
| | | At 0 to 5 minutes | At 15 to 20 minutes | Total number | |
| Controls | | 63 | 68 | 131 | |
| 4-(2'-carbomethoxyphenylamino)-7-trifluoromethylquinoline. | 20 | 22 | 64 | 86 | 66 |
| | 50 | 14 | 38 | 52 | 40 |
| | 100 | 2 | 17 | 19 | 14 |

The $DE_{50}$ of 4-(2'-carbomethoxyphenylamino)-7-trifluoromethyl-quinoline is 35 mg./kg. as compared to a $DE_{50}$ of 160 mg./kg. for aspirin under the same experimental conditions.

(3) *Acute toxicity.*—The acute toxicity test of 4-(2'-carbomethoxyphenylamino)-7 - trifluoromethyl-quinoline was made on lots of 10 mice of the Rockland strain weighing between 18 and 22 g. The product was administered orally in the form of aqueous suspensions in doses of 1 g. and 2 g./kg. The mice were placed under observation for a period of 48 hours. No manifestations of intoxication or mortality were noted in the course of this period.

(4) *Dosages.*—The usual useful dose of 4-(2'-carbomethoxyphenylamino)-7-trifluoromethyl-quinoline is between 0.05 gm. to 0.200 gm. per dose and a daily dose of 0.200 gm. to 1.0 gm. in adult depending upon the method of administration.

Various modifications of the process and compositions of the invention may be made without departing from the spirit or scope thereof, and it is to be understood that the invention is to be limited only as defined in the appended claims.

We claim:
1. 4 - (2' - carbomethoxyphenylamino) - 7 - chloro-quinoline.
2. 4 - (3' - carbomethoxyphenylamino) - 7 - chloro-quinoline.
3. 4 - (2' - carbomethoxyphenylamino) - 7 - methoxy-quinoline.
4. 4 - (2' - carbomethoxyphenylamino) - 6,8-dimethyl-quinoline.
5. 4-(2'-carbomethoxyphenylamino)-quinoline.
6. 4-(2'-carbamoylphenylamino)-7-chloro-quinoline.
7. 4 - (2' - carbomethoxyphenylamino) - 6,7-dimethyl-quinoline.
8. 4-(2'-carbobutoxyphenylamino)-7-chloro-quinoline.
9. 4 - (2' - carbomethoxyphenylamino) - 7,8 - dichloro-quinoline.
10. 4 - (2' - carbomethoxyphenylamino) - 6 - chloro-quinoline.
11. 4 - (2' - carbomethoxyphenylamino) - 8 - chloro-quinoline.
12. 4 - (2' - carbomethoxyphenylamino) - 7 - trifluoromethyl-quinoline.
13. A compound selected from the group consisting of 4-(2'-carbomethoxyphenylamino)-7-chloro-quinoline, 4-(3'-carbomethoxyphenylamino)-7-chloro-quinoline, 4-(2'-carbomethoxyphenylamino)-7-methoxy - quinoline, 4-(2'-carbomethoxyphenylamino)-6,8 - dimethyl-quinoline, 4-(2'-carbomethoxyphenylamino) - quinoline, 4 - (2'-carbamoylphenylamino) - 7 - chloro - quinoline, 4-(2'-carbomethoxyphenylamino-6,7-dimethyl-quinoline, 4-(2'-carbobutoxyphenylamino) - 7 - chloro - quinoline, 4-(2'-carbomethoxyphenylamino) - 6 - chloro-quinoline, 4-(2'-carbomethoxyphenylamino) - 8 - chloro-quinoline, 4-(2'-carbomethoxyphenylamino)-7-trifluoromethyl-quinoline, 4-(2'-carbomethoxyphenylamino) - 7,8 - dichloro-quinoline and their non-toxic, pharmaceutically acceptable acid addition salts.

References Cited by the Examiner

UNITED STATES PATENTS

| | | | |
|---|---|---|---|
| 1,181,485 | 5/16 | Schwabe | 260—287 |
| 1,810,267 | 6/31 | Desamari | 260—287 |
| 2,474,823 | 7/49 | Burckhalter et al. | 260—288 |
| 2,935,448 | 5/60 | Calder | 167—65 |
| 2,994,640 | 8/61 | Zellner et al. | 167—65 |

FOREIGN PATENTS 321,738 11/29 Great Britain.

OTHER REFERENCES

Chatterjee: Chem. Abstracts, vol. 51, cols. 3596g (1957).

Fuller et al.: J. Chem. Soc. (London), 1948, page 241.

Greenhalgh et al.: Brit. J. Pharmacology, vol. 11, pp. 220–4 (1956).

Yale: J. Med. and Pharm. Chemistry, vol. 1, No. 2, pp. 121–133 (1959).

NICHOLAS S. RIZZO, *Primary Examiner.*

D. T. McCUTCHEN, JOHN D. RANDOLPH,
*Examiners.*